United States Patent
Evans et al.

(10) Patent No.: US 6,616,861 B1
(45) Date of Patent: Sep. 9, 2003

(54) RAPID OXYGEN ABSORPTION BY USING ACTIVATORS

(75) Inventors: Susan P. Evans, Canandaigua, NY (US); Vinod K. Luthra, Pittsford, NY (US); Kalathur S. V. Santhanam, Rochester, NY (US); R. Andrew Sloan, Palmyra, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 09/676,274

(22) Filed: Sep. 28, 2000

Related U.S. Application Data

(60) Provisional application No. 60/157,297, filed on Oct. 1, 1999.

(51) Int. Cl.[7] .......................... C09K 15/02; C09K 15/06
(52) U.S. Cl. .................. 252/188.28; 252/191; 426/124
(58) Field of Search ...................... 252/188.28, 181.3, 252/181.4, 191; 426/124, 118

(56) References Cited

U.S. PATENT DOCUMENTS

| | | | |
|---|---|---|---|
| 4,127,503 A | 11/1978 | Yoshikawa et al. ......... 252/429 |
| 4,166,807 A | 9/1979 | Komatsu et al. ............ 252/439 |
| 4,299,719 A | 11/1981 | Aoki et al. .................. 252/188 |
| 4,588,561 A | 5/1986 | Aswell et al. ............... 422/238 |
| 4,594,130 A | 6/1986 | Chang et al. ................. 162/16 |
| 4,711,741 A | 12/1987 | Fujishima et al. .......... 252/188 |
| 4,769,175 A | 9/1988 | Inoue ...................... 252/188.28 |
| 4,820,442 A | 4/1989 | Motoyama et al. .... 252/188.28 |
| 4,868,346 A | 9/1989 | Kiser ......................... 568/916 |
| 4,942,048 A | 7/1990 | Nasu et al. .................. 426/271 |
| 4,996,068 A | 2/1991 | Hatakeyama et al. ....... 426/234 |
| 5,085,878 A | 2/1992 | Hatakeyama et al. ....... 426/107 |
| 5,115,624 A | 5/1992 | Garwood ...................... 53/427 |
| 5,143,763 A | 9/1992 | Yamada et al. ............. 428/36.2 |
| 5,207,943 A | 5/1993 | Cullen et al. ................ 252/188 |
| 5,211,875 A | 5/1993 | Speer et al. ........... 252/188.28 |
| 5,262,375 A | 11/1993 | McKedy ..................... 502/406 |
| 5,332,590 A | 7/1994 | McKedy ..................... 426/398 |
| 5,350,622 A | 9/1994 | Speer et al. ................. 428/215 |
| 5,364,555 A | 11/1994 | Zenner et al. ......... 252/188.28 |
| 5,399,289 A | 3/1995 | Speer et al. ........... 252/188.28 |
| 5,425,986 A | 6/1995 | Guyette ....................... 428/283 |
| 5,492,742 A | 2/1996 | Zenner et al. ............. 428/35.2 |
| 5,498,364 A | 3/1996 | Speer et al. ............. 252/188.8 |
| 5,504,095 A | * 4/1996 | Nakane et al. ............... 514/360 |
| 5,621,010 A | * 4/1997 | Sueda et al. ................. 514/596 |
| 5,648,020 A | 7/1997 | Speer et al. ........... 252/188.28 |
| 5,698,250 A | 12/1997 | DelDuca et al. ............. 426/124 |
| 5,700,554 A | 12/1997 | Speer et al. ................. 428/220 |
| 5,725,795 A | 3/1998 | Kashiba .................. 252/188.28 |
| 5,798,177 A | 8/1998 | Jansson ....................... 428/403 |
| 5,925,166 A | * 7/1999 | Viau et al. ..................... 75/369 |
| 5,928,560 A | 7/1999 | DelDuca et al. ........ 252/188.28 |
| 6,209,289 B1 | * 4/2001 | Cullen et al. .................. 53/432 |
| 6,248,690 B1 | * 6/2001 | McKedy ..................... 502/406 |

OTHER PUBLICATIONS

PCT Search Report for International Application No. PCT/US00/26466, dated Jan. 5, 2001.

* cited by examiner

*Primary Examiner*—Joseph D. Anthony
(74) *Attorney, Agent, or Firm*—Jenkens & Gilchrist

(57) ABSTRACT

Absorbing oxygen from a closed space at a rapid rate, particularly in food packaging, is made possible by introducing an alcohol-water mixture as an activator for iron-based absorber systems, preferably including an acid to control pH. Preferred alcohols are aliphatic alcohols, particularly, monohydric alkanols, such as methanol, ethanol, n-propanol, isopropanol, sec-butanol and t-butanol. Such absorber-activator combinations are capable of rapidly reducing the oxygen in a closed package. A preferred acid is orthophosphoric acid used in an amount sufficient to establish a pH of about 0.6 to 4. A preferred iron-based absorber system employs sponge iron, optionally including a dibasic acid cooperating with the orthophosphoric acid to control pH in the system. In one preferred embodiment, the iron-based absorber is pre-activated by contacting with the activator in the substantial absence of oxygen for a predetermined period of time.

1 Claim, No Drawings

RAPID OXYGEN ABSORPTION BY USING ACTIVATORS

This application claims the benefit of provisional application Ser No. 60/157,297 filed Oct. 1, 1999.

FIELD OF THE INVENTION

The present invention relates generally to a method for maximizing the rate of oxygen uptake of an iron-based oxygen absorber. More particularly, the invention relates to improved activators for iron-based oxygen scavenging packets.

BACKGROUND OF THE INVENTION

Perishable foods, such as meats, fruits, and vegetables, are typically placed into packaging systems after harvesting in order to preserve these foods for as long as possible. Maximizing the time in which the food remains preserved, especially the time between initial packaging at the plant and delivery at the retail grocery store, increases the profitability of all entities in the chain of distribution by minimizing the amount of spoilage.

The environment in which the food is preserved is a critical factor in the preservation process. Not only is maintaining an adequate temperature important, but the composition of the gases surrounding the food is important as well. By providing the appropriate gas composition to the environment surrounding the food, it can be better preserved when maintained at the proper temperature or even when it is exposed to variations in temperature. This gives the food producer some assurance that after the food leaves his or her control, the food will be in an acceptable condition when it reaches the retail grocery store and, ultimately, the consumer.

In particular, meat packaging systems which provide extremely low levels of oxygen are desirable because it is well known that the fresh quality of meat can be preserved longer under anaerobic conditions than under aerobic conditions. Maintaining low levels of oxygen minimizes the growth and multiplication of aerobic bacteria.

One way to insure a minimal level of oxygen in a meat package is to subject the package or rigid gas barrier materials to a vacuum in order to remove as much of the gas in the package as possible prior to sealing. The package can then be sealed and the meat maintained in a "zero" atmosphere environment (commonly referred to as vacuum packaging), provided that the packaging materials prevent oxygen migration). Under vacuum packaging conditions, red meat becomes purple. Since consumers prefer to see bright red meat, vacuum packaging has not been well accepted for consumer cuts of meat.

Another means for insuring a minimal level of oxygen in a meat package is to seal the meat in a refill-modified atmosphere packaging system. This kind of modified atmosphere packaging technology (MAP) is so successful that meat can be cut and packaged several weeks before purchase and still remain fresh. Such systems typically utilize multiple layers of packaging. The outside layer is generally a rigid container with good barrier properties. The inner layer is an oxygen permeable film. To provide a modified atmosphere environment, the air-evacuated package is typically filled with a mixture of gases consisting of about 30% carbon dioxide ($CO_2$) and 70% nitrogen (N2). Refilling the air-evacuated package with such a mixture of gases is believed to suppress the growth of anaerobic bacteria. The outer layer is peeled off just prior to presenting the meat for sale at the supermarket. This allows oxygen to pass through the inner layer and contact the meat, causing it to rebloom to a bright red color. Such an evacuation and refill MAP process is described in U.S. Pat. No. 5,115,624 to Garwood. It is very expensive for three reasons. First, the rigid part of the package is expensive. Second, processing speeds are slow due to the vacuum and refill steps. And third, the equipment to perform these procedures is very complicated and expensive.

Another less expensive means for insuring a minimal level of oxygen in a meat package is to use a gas flush MAP process. The complicated steps of evacuating the package and refilling with the desired gas mixture are eliminated. The outer bag (a barrier layer) is simply flushed with the proper gas mixture as it is formed around the inner container. The flush process reduces the oxygen content of the package to about 2%. An oxygen scavenger is placed in the package to absorb additional oxygen just prior to, or simultaneously with, forming and flushing the outer bag. An example of such a gas-flush MAP system is described in U.S. Pat. No. 5,698,250.

A critical feature of a gas flush MAP packaging system is the ability to keep meat looking fresh and palatable. Oxidized meat turns an undesirable brown color. Thus, it is critically important to quickly remove the oxygen from the package in order to prevent the meat from turning brown. If oxygen is removed quickly, the packaged meat turns a purple red color, which quickly "blooms" to a bright red color upon removal of the outer layer of packaging.

Various types of oxygen scavengers are used in packaging systems in order to protect meat and other products from the detrimental effects of oxygen exposure.

Oxygen scavenging by polymer barrier films has been discussed in several patents. U.S. Pat. No. 5,350,622 discusses the incorporation of an oxygen scavenging layer into a barrier material with an adjustable capacity. Many polymer films, such as poly(ethylene-vinyl acetate), trans-poly (isoprene), poly(ethylene-vinyl acetate), etc., are discussed in this patent. Further modifications have been reported in U.S. Pat. Nos. 5,648,020, 5,498,364, 5,425,986 and 5,399,289.

Oxygen scavenging by using organic compounds, such as substituted and unsubstituted ethylenically unsaturated hydrocarbons and transition metal catalysts, have been reported in U.S. Pat. Nos. 5,700,554 and 4,769,175. Chelates and complexes of salicylic acid have also been proposed for speeding the oxygen absorption in U.S. Pat. No. 5,364,555. Polymer films having deoxidizers have been suggested in U.S. Pat. No. 4,299,719, which uses ferrous carbonate as the deoxidizer in the polymer film. Polyorganosiloxanes have been shown in U.S. Pat. No. 5,143,763 to have a good oxygen-absorbing capacity when present as a layer in the polymer. Several deoxidizers have been found to be suitable for oxygen scavenging and are reported in U.S. Pat. Nos. 5,085,878 and 4,996,068. In one example, salicylic acid chelate or its complex with metal ions has been suggested in U.S. Pat. No. 5,492,742. Several radiation induced oxygen absorbers have been reported in U.S. Pat. No. 5,211,875.

Other oxygen scavengers utilize the oxidation of particulate iron as a method to absorb oxygen. U.S. Pat. No. 4,127,503 discloses oxygen absorbers having a metal powder (iron) covered with a metal halide. A large number of absorbers with the absorbing speeds in the range of 0.05 to 6.8 mL oxygen/hour were prepared using different metal halides. The nature of the metal used in the absorber can affect performance, as disclosed in U.S. Pat. No. 5,207,943, where a highly reactive iron (electrolytically manufactured) drives the reaction efficiently even in a low moisture atmosphere. A sulfur-containing oxygen scavenger has been proposed in U.S. Pat. No. 4,166,807, which has the advantage of reducing the secondary hydrogen generation. U.S. Pat. Nos. 5,332,590 and 5,262,375 discuss the effect of electrolytically annealed iron on oxygen absorption. In one example, the rate of oxygen absorption at 38° F. (3.3° C.) is increased from 2.4 cc/hour using unannealed iron to 4 cc/hour with annealed iron. At a higher temperature (72° F., 22.2° C.), the rate of absorption increases to 16.6 cc/hour with the annealed iron. A similar iron-based oxygen absorber has been proposed for removing oxygen from any gaseous mixture in U.S. Pat. No. 4,588,561. A mixture of halogen-containing oxyacid salt, such as sodium perchlorate or sodium chlorate with iron, has been proposed in U.S. Pat. No. 4,711,741.

Water facilitates the oxidation of iron. A water attracting agent such as silica gel may be used to attract water and, at times, to supply water to the iron in the packet. A drawback to this technology, however, is the limited amount of water that can be supplied. Typically, a major portion of the water needed for the oxidation of particulate iron is provided by the product and/or packaging environment being protected. This is oftentimes an inadequate amount to promote the efficient and rapid oxidation of iron.

A need, thus, exists to accelerate the rate of oxygen scavenging, particularly in the confines of a modified atmosphere packaging system. It is desirable to lower the oxygen level rapidly and to about zero within 24 hours. In U.S. Pat. No. 5,928,560, this objective is met by increasing the rate of oxygen absorption with addition of accelerators such as water, acetic acid, and citric acid to an iron-based oxygen absorber in amounts which optimize the rate of oxygen absorption. The present inventors have discovered a new class of accelerators which substantially increases the rate and amount of oxygen absorbed in packaging, not only for meat, but many other applications as well. It has also been discovered that a particular form of iron is especially useful with the new accelerators and that the auxiliary ingredients found in many commercial absorbing packets need not be used.

SUMMARY OF THE INVENTION

The present invention provides an iron-based oxygen scavenging system which exhibits an increased rate of oxygen absorption, which is especially useful in the packaging of meat or other foods. The invention includes a new iron-based absorber composition and an improved activator employing an alcohol, which may be used with both conventional iron-based absorbers and the new iron-based absorber.

In one preferred embodiment, the invention is an oxygen scavenging composition containing sponge iron optionally including a dibasic acid, but without the silica gel, salts, and fillers typically found in the art. The sponge iron will typically be contained within a packet containing about 0.5 to 40 grams, which is suitable for many food packaging and similar applications.

The invention includes in the activator at least one alcohol containing one or more hydroxyl groups and water, optionally including an acid to control pH within the range of about 0.5 to 5, preferably about 0.6 to 4. The alcohol containing one or more hydroxyl groups preferably is an aliphatic alcohol. The activator is introduced in a suitable amount, broadly between about 0.05 and 2.0 mL/g Fe, preferably about 0.15 to 0.25 mL/g Fe. The activators preferably are miscible alcohol-water mixtures containing about I to 99 vol % alcohol, for example 25 to 50 vol %, or they may be biphasic. In some applications, alcohol alone may be used. Preferably, the alcohol is at least one monohydric aliphatic alcohol, in particular, a primary, secondary, or tertiary alkanol, especially, methanol, ethanol, n-propanol, isopropanol, sec-butanol or t-butanol.

In one embodiment, compounds of alkali, alkaline earth, or transition metals are added to the alcohol or alcohol-water mixture.

In another aspect, the invention is an improved method for rapidly removing oxygen from a closed package with an iron-based absorbing system, preferably employing sponge iron as the absorber and as an activator an alcohol-water mixture. In an especially preferred embodiment, tartaric acid is packaged with the sponge iron and orthophosphoric acid is added to the alcohol-water mixture to provide a pH in the range of about 0.6 to 4.

In a preferred method of employing activators, the invention comprises a pre-activation of the iron-containing absorbent packets by introducing the activating fluid for a period of up to 24 hours before use in the absence of oxygen.

DESCRIPTION OF THE ILLUSTRATIVE EMBODIMENTS

The introduction of an activator into a packet of an iron-based oxygen absorber increases the rate of oxygen uptake by the iron inside the packet. The particulate iron in the packet, turns to iron oxides as oxygen is absorbed from the atmosphere surrounding a packaged food product or within some other enclosed space from which oxygen must be removed.

Iron-Based Absorbers

Previously described iron-based absorbers, such as those mentioned above, typically employed powdered iron particles combined with water absorbing materials, e.g. silica gel, salts, e.g. sodium chloride, and a carbon dioxide generator, e.g. sodium bicarbonate plus citric acid. While such oxygen-absorbing compositions are useful with the accelerators described below, we have found a new oxygen-absorbing composition consisting solely of sponge iron or optionally containing an acid which cooperates with accelerator compositions which include orthophosphoric acid or other suitable acids.

Sponge iron has been defined as ". . . a finely divided porous form of iron made by reducing iron oxide at such low temperatures that melting does not occur . . ." (The Condensed Chemical Dictionary, 10$^{th}$ ed, 1981, Van Nostrand Reinhold company Inc.) This type of iron has been found to be particularly useful, which may be the result of its porosity and high surface area. Sponge iron has been found to be effective in systems of the invention, removing oxygen rapidly at temperatures near freezing, and having a high capacity for oxygen. Further, it has been found unnecessary to include water absorbers, salts and carbon dioxide generators, although they could be included if desired. Thus, the sponge iron may be used alone, although in a preferred embodiment, a dibasic acid may be included to assist maintaining the desired pH, as will be discussed in more detail below.

The sponge irons found to be useful in the oxygen-absorbing system of the invention have the following physical properties:

| | |
|---|---|
| Apparent density: | 2.6 gm/cm$^3$ (2600 kg/m$^3$) |
| Particle size: | <180 μm (−80 mesh, U.S. std) |
| Oxygen content: | ≦1 wt %, preferably ≦0.5% |

Activators

It has been discovered that using alcohols as activators for iron-based absorbers provides a substantial increase in the rate of oxygen removal. Activation with alcohols makes it possible to reduce the amount of iron in the packets used for removing oxygen in packaging systems and to improve the performance.

While it has been generally known that iron oxidizes in the presence of water and corrodes in the presence of alcohols, it was surprising to discover that oxidation of iron powders is much more rapid when alcohols are present. As will be seen, the ratio of alcohol to water also affects the rate of oxygen absorption. The inventors have found that water is not required and that it is feasible to use alcohols alone to activate the oxidation of iron. Although the invention does not require that the exact nature of the reactions be known, it is believed that when alcohols are present, they create an alkoxide at the surface of the iron particles which facilitates the reaction of oxygen at the surface of the iron.

The term "alcohol" has been defined as "a broad class of hydroxyl-containing organic compounds . . ." (The Condensed Chemical Dictionary, 10$^{th}$ Edition, Van Nostrand Reinhold, 1981). They may contain one or more hydroxyl groups and, thus, the term may refer to monohydric, dihydric, trihydric, and polyhydric compounds. The hydroxyl groups may be attached to either saturated or unsaturated hydrocarbon structures, such as those classified as aliphatic alcohols. Generally, selection of alcohols for use in the invention will depend on economic factors such as cost, availability, and performance, such as speed of reaction with iron and the resulting absorption of oxygen. Governmental regulations and compatibility with the product being protected will also be factors, particularly for food packaging. In theory, while many alcohols, as broadly defined, could find use as activators, in practice, monohydric alcohols, including primary, secondary, and tertiary aliphatic alcohols, are preferred because of their availability and cost. Particularly, the alkanols, e.g., methanol, ethanol, n-propanol, isopropanol, sec-butanol or t-butanol have been found to provide good performance, as will be seen in the Examples below.

Examples of other alcohols which may be used include dihydric alcohols, such as ethylene glycol, trihydric alcohols, such as glycerol, and polyhydric alcohols with more than three hydroxyl groups, such as pentaerythritol. Alcohols having unsaturated hydrocarbon structures include alcohols such as vinyl alcohol. While lower alcohols such as methanol, ethanol, and the propanols are completely soluble in water, other alcohols, such as butanol or hexyl alcohol, are not. Thus, if such alcohols are selected as activators, then biphasic mixtures can result, which are not excluded from the broad scope of the present invention.

It has been proposed to add ethyl alcohol to inhibit growth of bacteria under anaerobic conditions. In U.S. Pat. No. 4,942,048, it was disclosed that, unexpectedly, ethyl alcohol vapor, added to inhibit bacteria growth, was oxidized to acetaldehyde by the iron powder deoxygenating agent. There was no suggestion that the ethyl alcohol vapor had any affect on the removal of oxygen. Furthermore, the patentees appeared to reduce the oxygen concentration at a much lower rate than is shown by the present inventors. To solve their problem, the patentees proposed using compounds having amino groups, preferably weakly basic anion exchange resins. Contrary to these findings, the present inventors would introduce significant amounts of liquid alcohols, rather than alcohol vapor, as activators to accelerate oxygen removal. Under these conditions, oxidation of the alcohols to the corresponding aldehydes has not been found to occur.

In some applications, it is desirable to control the rate at which oxygen is absorbed and the time period over which oxygen can be absorbed at a high rate. At times a high initial rate of oxygen absorption is satisfactory, as when the initial oxygen concentration is removed, subsequent infiltration of oxygen from outside the package or exuded from the packaging materials or the contents of the package is not sufficient to cause the oxygen concentration to rise. At other times, the rate at which oxygen enters the vapor space within the package after the initial oxygen concentration has been reduced to a low level can be significant, so that the oxygen absorber must be able to retain its ability to remove oxygen at a high rate for a longer period until an equilibrium condition has been reached. In such situations, it has been found that addition of an acid to the accelerator is desirable.

While various acids may be used, such as acetic acid, citric acid and hydrochloric acid, the preferred acid is orthophosphoric acid. It is acceptable for food grade applications such as meat packaging, however, it is important to use the proper amount. In general, the amount of acid is determined by the desired pH of the accelerator solution, preferably in the range of 0.6 to 4. It is believed that a pH below about 0.5 will interfere with oxidation of iron. In general, an acidic medium is preferred since a basic medium will reduce the rate of oxidation of iron.

It may be desirable to limit the amount of orthophosphoric acid added to the accelerator solution. In such a case, it is possible to add another complementary acid to the sponge iron in the oxygen-absorbing packet. For this purpose, tartaric acid or fumaric acid are preferred for their cost and ease of handling, but other dibasic acids, such as maleic acid, malic acid, mandelic acid and succinic acid may be used. More broadly, other acids having dissociation constants similar to tartaric and fumaric acids may be used in applications where they are acceptable, for example, oxalic, pyruvic, trichloro acetic. The amount added to the packet will be sufficient to maintain the pH of the solution at the desired level, that is 0.5 to 5, preferably 0.6 to 4. For example, a packet may consist of 88–100 wt % sponge iron and 0–12 wt % tartaric acid. When fumaric acid is used, a packet may consist of 77–100 wt % sponge iron and 0–23 wt % fumaric acid. Typically, the weight ratio of iron to acid is about 3.3–15/1.

Combining the Oxygen Absorber With the Accelerator

In U.S. Pat. No. 5,928,560, it is shown that an optimum volume of activator liquid should be added for a given weight of iron, which is to be oxidized. Such an optimum is believed to exist for the alcohol activators of the present invention, although it will vary depending on a number of factors. Generally, increasing the amount of alcohol present for each unit of iron will increase the initial rate of iron oxidation. It is believed, however, that the access of oxygen to the iron particles will also be affected by the amount of liquid present. Thus, while the liquid alcohol may be needed to activate the surface of the iron particles to speed up oxidation, excessive amounts of liquid may be expected to reduce access of oxygen to the iron and actually slow down oxidation reaction.

In general, the amount of activators combined with iron will be at least that needed to reduce the oxygen content of a package to a desired level within a predetermined period of time, for example, reducing the oxygen content of a package from about 2% to 400 ppm within 90 minutes. The actual requirements of any particular package will be determined by several factors. The present invention provides much improved performance over those discussed in the '560 patent. The optimum amount will be determined for each absorbent/activator system. Typically, it is expected to be between about 0.05 to 2 mL of the activating liquid for each gram of iron, preferably about 0.15 to 0.25 mL per gram of iron. It has been found that the rate of oxygen absorption is also affected by the relative proportions of water and alcohol in the activator. In general, the alcohol will be between about I to 99% by volume, for example, 25 to 50 vol %. Alcohol alone can be used, however, substantially in the absence of water.

The art generally indicates that metal halides have been included in absorber compositions. It has been found that addition of compounds of alkali, alkaline earth, and transition metals may be desirable to modify the effect of alcohol or alcohol/water mixtures. As will be seen in the Examples below, in some circumstances the rate of oxygen absorption can be affected by introducing such compounds into the liquid activators.

Examples of metal compounds which may be employed include alkali metal compounds, such as sodium chloride or potassium chloride, alkaline earth metal compounds, such as calcium chloride or calcium hydroxide, and transition metal compounds, such as cupric chloride or cobalt chloride.

A modified atmosphere package is disclosed in U.S. Pat. No. 5,698,250. The package contains an oxygen scavenging packet to absorb residual oxygen remaining after the package has been flushed with the desired gases to remove air. The activator solution can be introduced into a packet containing the iron-based oxygen absorber using an injection-type process. Alternatively, the solution can be included in an absorber packet in a separate capsule or compartment which can be ruptured at the time of sealing the package. In another method, a wick could be included in, and protrude from, the packet such that the wick could be dipped in liquid just prior to sealing the package.

One embodiment of the present invention involves the injection of an alcohol-water mixture into the packets, such as those manufactured by Multisorb Technologies Incorporated or those containing sponge iron according to the present invention, just prior to placement of the absorber into a package. This can be done manually with a syringe and hand placement or the process can be automated by using a commercially available metering and dispensing pump and appropriate conveying equipment to position the packets for injection and then subsequently to place the packets into a package.

It has been discovered that the rate of oxygen removal from a package can be increased by pre-activating the iron-containing absorber packet. As will be seen in the examples below, introducing a predetermined amount of the activating fluid into absorber packet and holding the packet for a suitable period of time, e.g., up to about 24 hours in the substantial absence of oxygen, activates the absorbing composition. Then, when later exposed to oxygen, it is very rapidly absorbed. This capability will make possible use of iron-based absorbers in new applications.

It is believed that an optimum period for pre-activation exists for each absorbing composition and that there is an optimum amount of activator, as has already been discussed. Generally the optimum pre-activation period is believed to be about 6 to 24 hours, but periods of time outside that range may be needed with absorbing compositions other than those tested by the present inventors. In general, the amount of activating liquid used will be in the range of 0.05 to 2.0 mL/g Fe, preferably about 0.15 to 0.25 mL/g Fe, but generally is similar to the amount used when the packet is not pre-activated. The actual amount chosen will vary depending upon the iron-based absorbing composition and the activator used. It has also been discovered that once a packet has been pre-activated, that in the absence of oxygen, the activity remains available for at least 30–60 days, perhaps longer.

In the following Examples, five absorber compositions, including both electrolytically reduced and non-electrolytically reduced iron and other electrolytes (identified only, proportions not known) obtained from a commercial supplier, were tested with alcohol activator compositions, as given in the following Tables.

TABLE A

| | Absorber No. | | | | |
|---|---|---|---|---|---|
| Component | IA (g) | IB (g) | IC (g) | II (g) | III (g) |
| powdered iron[1] | 2.61 | 1.31 | 0.87 | 5 | 2.5 |
| total electrolyte | 1.11 | 0.58 | 0.42 | 5 | 3 |
| total weight | 1.72 | 1.89 | 1.29 | 10 | 5.5 |

[1]Theoretical oxygen capacity of iron is 295 mL/g.

TABLE B

| Activator No. | Composition | Volume Ratio |
|---|---|---|
| 1 | $CH_3OH$—$H_2O$ | 5/5 |
| 2 | $CH_3OH$—$H_2O$ | 9/1 |
| 3 | $CH_3OH$—$H_2O$-0.2 wt. % $FeCl_3$ | 1/9 |
| 4 | $C_2H_5OH$—$H_2O$ | 5/5 |
| 5 | $C_2H_5OH$—$H_2O$ | 9/1 |
| 6 | $iC_3H_7OH$—$H_2O$ | 1/9 |
| 7 | $iC_3H_7OH$—$H_2O$ | 2/8 |
| 8 | $iC_3H_7OH$—$H_2O$ | 3/7 |
| 9 | $iC_3H_7OH$—$H_2O$ | 4/6 |
| 10 | $iC_3H_7OH$—$H_2O$ | 5/5 |
| 11 | $CH_3OH$ | — |
| 12 | $C_2H_5OH$ | — |
| 13 | $iC_3H_7OH$ | — |
| 14 | $H_2O$ | — |
| 15 | [(1)]$CH_3COOH$—$H_2O$ | 5/95 |
| 16 | $t$-$C_4H_9OH$ | — |
| 17 | $t$-$C_4H_9OH$ | 5/5 |
| 18 | $t$-$C_4H_9OH$ | 1/9 |
| 19 | $t$-$C_4H_9OH$ | 9/1 |
| 20 | $n$-$C_3H_7OH$ | — |
| 21 | $n$-$C_3H_7OH$ | 5/5 |
| 22 | $n$-$C_3H_7OH$ | 1/9 |
| 23 | $n$-$C_3H_7OH$ | 9/1 |

TABLE B-continued

| Activator No. | Composition | Volume Ratio |
|---|---|---|
| 24 | Sec-$C_4H_9OH$ | — |
| 25 | Sec $C_4H_9OH$ | 5/5 |
| 26 | Sec-$C_4H_9OH$ | 1/9 |
| 27 | Sec-$C_4H_9OH$ | 9/1 |

[(1)]vinegar

EXAMPLE 1

In each experiment an absorber from Table A was placed in a porous packet made of compressed polyethylene fibers and sealed. Then, the sealed packet was placed in a 4 liter multi-layer bag [nylon-PE-EVA; thickness 3 mils (0.075 mm), tensile strength 15,000 lb/in$^2$ (103.4 MPa), oxygen permeability 3.9 cc/100 in$^2$/24 hours (60.4 mL/m$^2$/24 hours)]. The multi-layer bag was filled with a gas mixture of about 70 vol. % nitrogen, 28 vol. % carbon dioxide, and 2 vol. % oxygen. (Thus, the bag contained about 80 mL of oxygen.) Then, a predetermined volume of the activating liquid was injected into the oxygen-absorbing packet and the multi-layer bag was stored between 33° F. and 37° F. (0.5–2.8° C.). Samples of the gas within the multi-layer bag were taken after 1 hour and then at daily intervals to determine the continued effectiveness of the absorber. The gas was analyzed for its oxygen content. The results of a series of tests carried out with the absorbers and activators of Tables A and B are given in the following Tables C to F, which report the performance of each type of alcohol with various absorbers.

TABLE C

| Absorber | Activator No. (type, vol/vol) | Activator Volume (mL/g Fe) | Oxygen Fraction Remaining After 1 Hour | Rate of Absorption For First Hour (cc/hour) | $O_2$ Concentration up to 35 days |
|---|---|---|---|---|---|
| IA | 1 (MeOH 5/5) | 0.07 | 0.76 | 19.2 | 0 |
| IA | 1 (MeOH 5/5) | 0.38 | 0.68 | 25.6 | 0 |
| IA | 1 (MeOH 5/5) | 0.57 | 0.55 | 36.0 | 0 |
| IA | 2 (MeOH 9/1) | 0.19 | 0.55 | 36.0 | 0 |
| IA | 2 (MeOH 9/1) | 0.38 | 0.41 | 47.2 | 0 |
| IA | 2 (MeOH 9/1) | 0.57 | 0.22 | 62.4 | 0 |
| IC | 2 (MeOH 9/1) | 1.72 | 0.10 | 72 | 0 |
| IC | 11 (MeOH) | 1.14 | 0.41 | 46.5 | NA |
| II | 1 (MeOH 5/5) | 0.10 | 0.27 | 58.4 | 0 |
| II | 2 (MeOH 9/1) | 0.20 | 0.001 | 79.9 | 0 |
| II | 3 (MeOH 1/9 + 0.2 wt % $FeCl_3$) | 0.30 | 0 | >80 | 0 |
| III | 11 (MeOH) | 0.40 | 0 | >80 | NA |

In each test, except the first listed, the oxygen content in the bag reached zero within a 24-hour period.

All of the data in Table C relates to using methanol as an activator. Increasing the amount of methanol in the activator increased the rate of oxygen absorption with both absorbers I and II. Pure methanol appears to perform in much the same way as aqueous solutions, so that water may not be required in order for oxidation of iron to proceed rapidly.

TABLE D

| Absorber | Activator No. (type, vol/vol) | Activator Volume (mL/g Fe) | Oxygen Fraction Remaining After 1 Hour | Rate of Absorption For First Hour (cc/hour) | $O_2$ Concentration up to 35 days |
|---|---|---|---|---|---|
| IC | 4 (EtOH 5/5) | 1.14 | 0.76 | 19 | 0 |
| II | 4 (EtOH 5/5) | 0.2 | 0 | >80 | NA |
| III | 12 (EtOH) | 0.4 | 0 | >80 | NA |

TABLE E

| Absorber | Activator No. (type, vol/vol) | Activator Volume (mL/g Fe) | Oxygen Fraction Remaining After 1 Hour | Rate of Absorption For First Hour (cc/hour) | $O_2$ Concentration up to 35 days |
|---|---|---|---|---|---|
| IB | 6 (iPrOH 1/9) | 1.14 | 0.28 | 57.6 | 0 |
| IC | 8 (iPrOH 3/7) | 1.14 | 0.80 | 16 | 0 |
| IC | 10 (iPrOH 5/5) | 1.14 | 0.50 | 40 | 0 |
| IC | 20 (n-PrOH) | 0.57 | 0.82 | 14.4 | 0 |
|    |              | 1.14 | 0.73 | 21.6 | 0 |
| IC | 21 (n-PrOH 5/5) | 0.57 | 0.84 | 12.5 | NA |
|    |                 | 1.14 | 0.84 | 12.5 | 0.81 |
| IC | 22 (n-PrOH 1/9) | 0.57 | 0.95 | 4.0 | NA |
|    |                 | 1.14 | 0.96 | 3.2 | 3.57 |
| IC | 23 (n-PrOH 9/1) | 0.57 | 0.83 | 13.6 | NA |
|    |                 | 1.14 | 0.80 | 16.0 | NA |
| II | 10 (iPrOH 5/5) | 0.20 | 0 | >80 | 0 |
| II | 20 (n-PrOH) | 0.1 | 0.25 | 60 | NA |
|    |             | 0.3 | 0 | >80 | NA |
| II | 21 (n-PrOH 5/5) | 0.1 | 0.24 | >80 | NA |
|    |                 | 0.3 | 0 | >80 | NA |
| II | 22(n-PrOH 1/9) | 0.1 | 0.35 | 52.0 | NA |
|    |                | 0.3 | 0.32 | 54.4 | NA |
| II | 23 (n-PrOH 9/1) | 0.1 | 0 | >80 | 0 |
|    |                 | 0.3 | 0 | >80 | 0 |
| III | 10 (iPrOH 5/5) | 0.80 | 0 | >80 | 0 |
| III | 10 (iPrOH 5/5) | 0.40 | 0 | 72 | 0 |
| III | 20 (n-PrOH) | 0.3 | 0 | >80 | NA |
| III | 21 (n-PrOH 5/5) | 0.3 | 0 | >80 | NA |
| III | 22 (n-PrOH 1/9) | 0.3 | 0.34 | 52.8 | NA |
| III | 23 (n-PrOH 9/1) | 0.3 | 0 | >80 | 0.4 |

TABLE F

| Absorber | Activator (type, vol/vol) | Activator Volume (mL/g Fe) | Oxygen Fraction Remaining After 1 Hour | Rate of Absorption For First Hour (cc/hour) | $O_2$ Concentration up to 35 days |
|---|---|---|---|---|---|
| IC | 16(t-BuOH) | 0.57 | 0.64 | 28.8 | 0 |
| IC | 17(t-BuOH 5/5) | 0.57 | 0.81 | 14.5 | 0 |
|    |                | 1.14 | 0.53 | 37.6 | 0 |
| IC | 18(t-BuOH 1/9) | 1.14 | 0.90 | 7.46 | 0 |
| IC | 19(t-BuOH 9/1) | 1.14 | 0.26 | 59.2 | 0 |
| IC | 24(sec-BuOH) | 1.14 | 0.49 | 40.8 | 1.16 |
| IC | 25 (sec. BuOH 5/5) | 0.57 | 0.93 | 12.0 | NA |
|    |                    | 1.14 | 0.82 | 14.4 | 0 |
| IC | 26 (sec. BuOH 1/9) | 1.14 | 0.91 | 7.2 | NA |
| IC | 27 (sec. BuOH 9/1) | 1.14 | 0.74 | 20.8 | 0 |
| II | 16(t-BuOH) | 0.3 | 0 | >80 | 0 |

TABLE F-continued

| Absorber | Activator (type, vol/vol) | Activator Volume (mL/g Fe) | Oxygen Fraction Remaining After 1 Hour | Rate of Absorption For First Hour (cc/hour) | $O_2$ Concentration up to 35 days |
|---|---|---|---|---|---|
| II | 17(t-BuOH 5/5) | 0.1 0.3 | 0.18 0 | 65.6 >80 | 0 0 |
| II | 18 (t-BuOH 1/9) | 0.3 | 0.10 | 72.0 | NA |
| II | 24 (sec-BuOH) | 0.3 | 0 | >80 | 0 |
| II | 25 (sec. BuOH 5/5) | 0.3 | 0.065 | 74.8 | 0 |
| II | 26 (sec. BuOH 1/9) | 0.3 | 0.15 | 68.0 | NA |
| III | 16 (t-BuOH) | 0.3 | 0 | >80 | 0 |
| III | 17 (t-BuOH 5/5) | 0.3 | 0 | >80 | 0 |
| III | 18 (t-BuOH 1/9) | 0.3 | 0.15 | 68.0 | 0 |
| III | 19 (t-BuOH 9/1) | 0.3 | 0 | >80 | 0 |
| III | 24 (sec-BuOH) | 0.3 | 0 | >80 | 0 |
| III | 25 (sec. BuOH 5/5) | 0.3 | 0 | >80 | 0 |
| III | 26 (sec. BuOH 1/9) | 0.3 | 0.081 | 73.5 | NA |

EXAMPLE 2

After all of the oxygen initially in the multi-layer bag (about 2%) was absorbed, additional air was introduced to raise the oxygen level to about 2% again. Then, the oxygen content in the multi-layer bag was tested periodically up to 35 days to determine the absorber's ability to maintain a low oxygen level. The results are shown in Table G.

TABLE G

| Absorber | Activator Volume (mL/g Fe) | Time To Initially Reach 0% $O_2$ | Time To Remove Added Oxygen (min.) | $O_2$ Concentration Up To 35 Days (%) |
|---|---|---|---|---|
| IC | 10 (iPrOH 5/5) (1.14) | 19 hours (2% to 0%) | 1 | 0 |
| II | 10 (iPrOH 5/5) (0.2) | 0.5 hours (2% to 0%) | 1 | 0 |
| II | 6 (iPrOH 1/9) (0.2) | 1 hour (2.1% to 0%) | 1 | 0.12 to 0 |
| II | 2 (MeOH 9/1) (0.2) | 1 hour (1.86% to 0%) | 1 | 0 |

Although absorber IC was much less effective in absorbing oxygen, reducing the oxygen level to 0% within 19 hours may be acceptable for some applications. Absorber II reduced the oxygen content more rapidly. It was surprising to find that additional oxygen was removed very rapidly with both absorbers. The absorber system apparently was activated during removal of the initial oxygen.

EXAMPLE 3

The oxygen absorption capacity for three absorbers was determined by periodically injecting oxygen into the multi-layer bags used in Examples 1 and 2 until additional absorption of oxygen was not measured. The results are shown in Table H.

TABLE H

| Absorber (g Fe) | Activator | Amount Of Activator/(g Fe) | cc of oxygen/ (g Fe) |
|---|---|---|---|
| I-C (0.85) | 10 (iPrOH 5/5) | 1.2 mL | 258.6 |
| II (5) | 10 (iProH 5/5) | 0.2 mL | 72 |
| II (5) | 1 (MeOH 5/5) | 0.2 mL | 76 |
| III (2.5) | 10 (iPrOH 5/5) | 0.4 mL | 129.6 |

The theoretical capacity of iron, when converted to $Fe_2O_3$, is about 295 cc $O_2$/g Fe. From the results shown in Table H, it may be concluded that absorber IC was completely converted to $Fe_2O_3$, while the more active absorbers II and III appeared to have unused capacity for oxygen, at least compared to the theoretical capacity, and may have been limited by the amount of the alcohol used.

EXAMPLE 4

In U.S. Pat. No. 5,928,560, the inventors considered that, for best results, when packaging meat using the modified atmosphere package system, the oxygen content of such packages should be reduced from about 2 to 0.04% within 90 minutes. This was shown to be feasible in tests carried out in one quart (0.95 liters) containers. The present inventors have found improved alcohol activators which make it possible to reduce the oxygen content from about 2% to 0% within 30 minutes or less in a 4L bag.

Tests were carried out using the procedures of Example 1, but samples were taken 15 minutes after the activator was introduced and then later to establish the time at which the oxygen content had been reduced to zero.

Absorbing composition I-A was able to reduce the oxygen content from 2.1% to 0.3% in about 15 minutes and to 0% in about 30 minutes. Absorbing composition II was able to reach 0% oxygen in only 18 minutes, while absorbing composition III reduced the oxygen content to 0% in about 15 minutes.

The conditions used for these tests are shown in Table I.

TABLE I

| Absorber | Activator No. type, vol/vol (mL) |
|---|---|
| I-A | 10 iPrOH 5/5 (1.5) |
| II | 10 iPrOH 5/5 (1.5) |
| III | 10 I PrOH 5/5 (1.5) |

EXAMPLE 5

The procedures described in Example I were repeated, except that alcohol mixtures or metal compounds were included in the activator solutions. The results are shown in Table J.

TABLE J

| Absorber | Activator (mL/g Fe) | Additive (wt %) | Rate of Absorption |
|---|---|---|---|
| IC | iPA/EtOH/H$_2$O 1/4/5 (1.72) | — | 80 mL O$_2$ removed in 45 minutes |
| IC | iPA/H$_2$O 5/5 (1.14) | NaCl (3) | 80 mL O$_2$ removed in 17 minutes |

EXAMPLES 6–12

In each of these examples, 5 gm of sponge iron (2.6 gm/cm$^3$ apparent density particle size<180 μm) was sealed in a Tyvek® packet, in some examples with L-tartaric acid. The packet was placed in a 4-liter multi-layer bag as described in Example 1, having an oxygen permeability of 3.9 cc/100 in $^2$/24 hrs (60.4 mL/m$^2$/24 hours). The bag was filled with a gas mixture of about 70 vol % nitrogen and 30 vol % carbon dioxide. Oxygen was introduced by injecting 360 mL of air to produce an initial oxygen concentration of about 2 vol %. Then, the packet was activated by injecting 1 mL of an activator solution. The bag was maintained between 33° F. and 37° F. (0.5–2.8° C.) and monitored periodically for oxygen concentration.

The conditions employed and the results obtained are given in the following table.

TABLE K

| Example No. | Packet Composition | | Activator (vol %) | | | Final O$_2$ Vol % (hr) |
|---|---|---|---|---|---|---|
| | Fe | Acid | iPA[b] | O-PA[c] | H$_2$O | |
| 6 | 5 g sponge | — | 5 | 20 | 75 | ≅0(6) |
| 7 | 5 g sponge | — | 5.5 | 17.66 | 76.84 | ≅0(≈24) |
| 8 | 5 g sponge | — | 2.5 | 14.12 | 83.38 | ≅0(≈24) |
| 9 | 5 g sponge | — | 5 | 0.012 | 94.988 | 1.2–1.4 (≈24) |
| 10 | 5 g sponge | 2.4 g L-t[a] | 5 | 0.012 | 94.988 | 0.019(6) |
| 11 | 5 g sponge | 0.6 g L-t | 2.5 | 0.1 | 97.4 | 0.096 ≈ (21) |
| 12 | 5 g sponge | — | 86 | —[d] | 13.99 | ≅0(1) |

[a]L-t = L-tartaric acid (Kramer Chemicals or Fisher Chemicals)
[b]iPA = isopropanol (Fisher Chemicals)
[c]O-PA = 85 wt % orthophosphoric acid in water (Fisher Chemicals)
[d]0.01 vol % HCl (Fisher Chemicals)

EXAMPLES 13–18

In these examples the procedure of Examples 6–12 were repeated and the rate of oxygen absorption was measured, with the results shown in the following table.

TABLE L

| Example No. | Packet Composition | | Activator (vol %) | | | O$_2$ Conc | |
|---|---|---|---|---|---|---|---|
| | Fe | Acid | iPA | O-PA | H$_2$O | After 1 hr | Ave. Rate |
| 13 | 5 g sponge | — | 5 | 20 | 75 | 0.58% | 57 mL/hr |
| 14 | 5 g sponge | — | 5.5 | 17.66 | 76.84 | 1.0% | 39 mL/hr |
| 15 | 5 g sponge | — | 2.5 | 14.12 | 83.38 | 0.74% | 50 mL/hr |
| 16 | 5 g sponge | — | 2.5 | 20 | 77.5 | 1.2% | 32 mL/hr |
| 17 | 5 g sponge | 0.6 g L-t | 5 | 0.012 | 94.988 | 1.1% | 34 mL/hr |
| 18 | 5 g sponge | 0.6 g L-t | 2.5 | 0.1 | 97.4 | 0.96% | 41 mL/hr |

EXAMPLES 19–22

In each of the following examples, an absorbing composition was placed in a 4-liter bag of the type used in the previous examples, which had been filled with 70% nitrogen and 30% carbon dioxide. Then, the activating fluid was introduced into the composition and the bag was kept at a temperature between 33° F. and 37° F. (0.5–2.8° C.) for a predetermined period of time. After the pre-activation period, 360 mL of air was injected into the bag, giving an initial oxygen concentration of about 2 vol %. Oxygen measurements were taken to determine the rate at which oxygen was absorbed by the pre-activation packet. When all the oxygen was removed immediately (i.e., within 15 minutes) 100 mL additional injections of air were made at about 15-minute intervals until a residual level of oxygen was found. The term "rapid capacity" used below is calculated as the amount of oxygen absorbed within the time elapsed before adding the last injection of air, that is the addition from which all the oxygen was not absorbed in a short period of time. The results of these experiments are reported in the following table.

TABLE M

| Example No. | Packet Composition | Pre-Activator (vol %) | Time @ 33–37 F. (hr) | Rapid $O_2$ Capacity (mL) |
|---|---|---|---|---|
| 19 | II | 1 mL vinegar[1] | 6 | 34 |
|    |    | 1.5 mL vinegar | 6 | 44 |
|    |    | 2.0 mL vinegar | 6 | 57 |
| 20 | II | 1 mL vinegar[1] | 24 | 105 |
|    |    | 1.5 mL vinegar | 24 | 150 |
|    |    | 2.0 mL vinegar | 24 | 150 |
| 21 | II | 2.5 mL iProH/$H_2O$[2] | 24 | 135 |
|    |    | 3.0 mL iProH/$H_2O$[2] | 24 | 212 |
| 22 | IB | 1.5 mL iProH/$H_2O$[2] | 6 | 45 |
|    |    | 2.0 mL iProH/$H_2O$[2] | 6 | 155 |
|    |    | 2.5 mL iProH/$H_2O$[2] | 6 | 155 |

[1] 6 vol % acetic acid
[2] 50/50 isopropanol/water

We conclude from the foregoing results that:

Increasing the pre-activation period from 6 hours to 24 hours increases the rapid capacity for oxygen absorption, which ranges from about 30 to 300 mL/g Fe.

Isopropyl alcohol-water mixture and vinegar both are useful as pre-activators.

Increasing pre-activation volume increases rapid capacity.

While the present invention has been described with reference to one or more particular embodiments, those skilled in the art will recognize that many changes may be made thereto without departing from the spirit and scope of the present invention. Each these embodiments and obvious variations thereof is contemplated as falling within the spirit and scope of the claimed invention, which is set forth in the following claims.

What is claimed is:

1. An oxygen-absorbing composition comprising sponge iron, optionally including water absorbing materials, carbon dioxide generating compounds and salts, and as an activator 2–10 vol. % isopropanol and 90–98 vol. % orthophosphoric acid in water to provide a pH of about 0.5 to 5.

* * * * *